Figure 2:
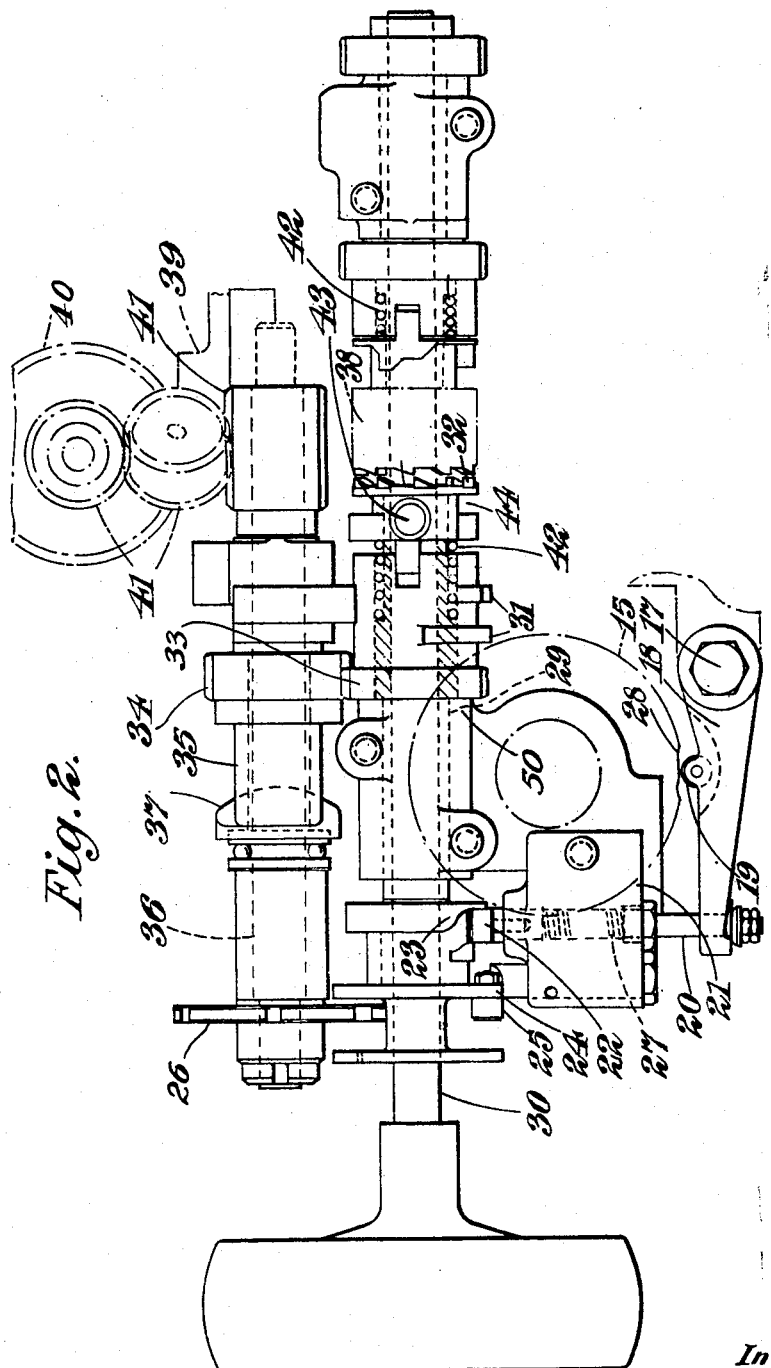

Oct. 6, 1953  W. E. R. PULMAN  2,654,271
INDEXING MECHANISM FOR TURRETS OF AUTOMATIC MACHINE TOOLS
Filed May 5, 1952  3 Sheets-Sheet 1

Inventor
William Elias Reginald Pulman

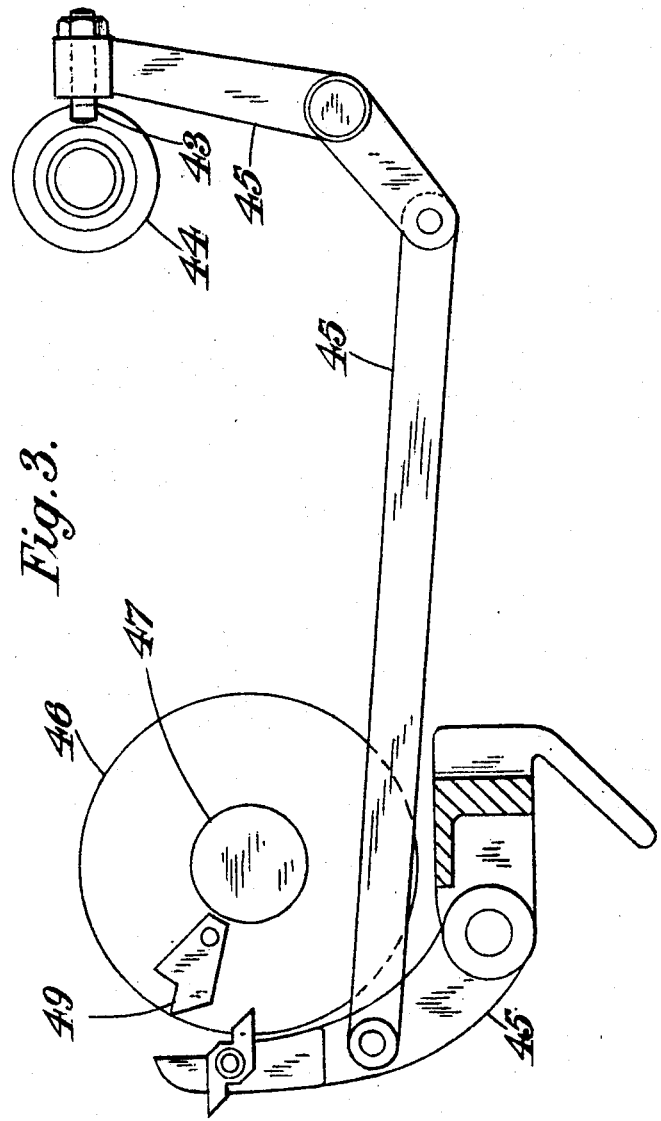

Inventor
William Elias Reginald Pulman

Patented Oct. 6, 1953

2,654,271

UNITED STATES PATENT OFFICE 2,654,271

INDEXING MECHANISM FOR TURRETS OF AUTOMATIC MACHINE TOOLS

William Elias Reginald Pulman, Hove, England, assignor to C. V. A. Jigs, Moulds & Tools Limited, Hove, England, a British company Application May 5, 1952, Serial No. 286,055
In Great Britain May 2, 1951

5 Claims. (Cl. 77—32.3)

This invention relates to indexing mechanism for turrets of automatic machine tools, and has for an object to render the indexing mechanism inoperative during certain predetermined periods of each cycle of the machine tool.

The machine tool is of the type in which the machining operations are controlled by first cams or the like on a continuously rotating shaft, while the operation of the indexing transmission of the turret is initiated by a second cam or the like on said continuously rotating shaft or another shaft gear connected therewith.

According to this invention an automatic machine tool of the kind referred to above is characterised in that said indexing transmission for the turret embodies a coupling and in that a third cam or the like driven in synchronism with said continuously rotating cam or the like is arranged to interrupt said coupling at predetermined intervals, whereby although movement of the part of the indexing transmission may be initiated indexing is not carried out.

The indexing transmission may comprise a rotatable Geneva wheel mounted on a shaft which wheel is engaged by a dog secured to and radially displaced from the axis of a parallel shaft, while the aforesaid coupling is constituted by means for imparting relative axial movement between the Geneva wheel and dog so that their paths of rotational movement may be brought clear of one another.

Means may be provided for adjusting the angular relationship of the third cam with respect to the continuously rotating shaft, whereby indexing is prevented after any machining operation.

The continuously rotating first cam may be so shaped as to effect a number of machining operations during one rotation of its shaft, while the second cam or the like is so shaped and arranged as to initiate the operation of the indexing transmission a like number of times during a cycle, while the third cam is so adjustably mounted as to enable the indexing transmission to be uncoupled after any of the machining operations.

The above arrangement is particularly applicable to automatic turret lathes which have means for effecting a straight line withdrawal of the tool along the axis of the workpiece when indexing the turret. The present invention permits withdrawal of the turret tool without the necessity of indexing and enables the same tool to operate upon the work in successive strokes of the turret slide, whereas, normally the turret would be indexed between successive strokes. For example, it enables a drill to be withdrawn from a hole which it has cut in the work so that the swarf may be cleared from the flutes of the drill, whereupon, the drill is reintroduced into the hole and a further cut effected, whereafter it may be again withdrawn and the swarf cleared.

The invention is particularly applicable to automatic turret lathes such as is described in the specifications of applications Nos. 286,054 and 288,588 which is provided with a continuously rotating front shaft, a cross shaft driven thereby, a continuously driven back shaft, a cam shaft arranged to be coupled to the back shaft through a one revolution clutch and having connected thereto a dog for driving a Geneva wheel mounted on an intermediate shaft, which intermediate shaft constitutes part of the transmission of the indexing mechanism. In such an arrangement, the aforesaid first cam is mounted on the cross shaft, and transmits movement to the turret slide in a cutting direction while the aforesaid second cam or the like is mounted on said front shaft and operates the one revolution clutch thereby causing the aforesaid dog of the Geneva mechanism to be driven when the third cam maintains the indexing transmission operative. The member carrying the dog is arranged to be axially slidable along the shaft which drives it and axial movement is imparted to it through a suitable transmission by the third cam which is mounted on the cross shaft.

Figure 1:
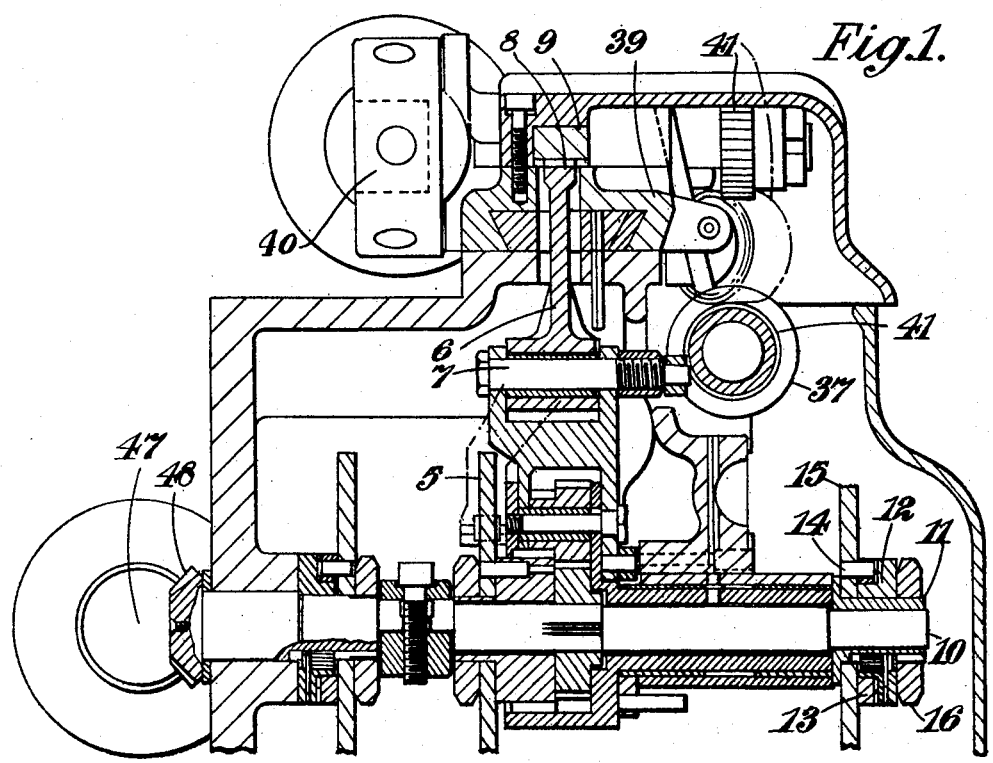

The following is a rather more detailed description of the invention applied to the automatic turret lathe as described in the specification of application No. 288,588 reference being made to the accompanying drawing in which:

Figure 1 is a cross-section through one end of the lathe showing the cross shaft and turret slide, Figure 2 is a front elevation of a part of the lathe showing the back shaft, intermediate shaft and the turret, and Figure 3 is an elevation of the lower link mechanism actuated by the second cam for initiating the indexing mechanism.

Mounted and pinned at one end of a cross shaft 10 is a first cam 5 which is engaged by a follower (not shown) at one end of a lever 6 pivoted at 7 and having a toothed sector 8 at the other end which engages a rack 9 on a turret slide 39 thus imparting feeding movement to a turret 40. The cam 5 may have a number of inflexions formed around it so as to effect a number of feeding movements during one revolution of the cross shaft. The other end of the cross shaft has pinned to it a sleeve 11 to which is keyed a multi-toothed clutch member 12. This clutch member is engageable with and drives a collar 13 having a corresponding number of teeth and carried by this collar is a driving pin 14 which engages a hole in a cam disc 15 which constitutes the aforesaid third cam. The assemblage is locked in position by a nut 16 which engages the threaded extremity of the sleeve 11. The multi-toothed clutch member 12 and collar 13 permits the cam disc 15 to be angularly displaced on the cross shaft for the purpose above referred to. The cross shaft is driven from the front shaft 47 through bevel gearing 48.

Mounted on the bed of the lathe is a stud 17 on which is pivoted a lever arm 18, the lever arm carries a roller 19 which engages the periphery of the aforesaid cam disc 15. The extremity of the lever arm 18 is bored or forked to receive a plunger 20 articularly connected thereto, which plunger is slidably mounted in a block 21 secured to the bed of the machine. The upper end of the plunger is provided with a roller 22 which in the upper position of the plunger is brought opposite a cam track on a face cam 23 which is connected to the aforesaid element 24 carrying the dog 25 for the Geneva wheel 26. A spring 27 is provided which normally urges the plunger upwardly, but this cannot take place until the roller 19 on the aforesaid lever arm enters one or other of a number of recesses 28 in the periphery of the disc cam 15. So long as the roller 22 at the upper end of the plunger 20 is out of alignment with the cam track 23 the dog 25 is engageable with the Geneva wheel 26. The member 24 carrying the dog 25 and the cam 23 are fixed to a sleeve 29 which is axially slidable along the back shaft 30, and which sleeve passes throught a bearing cap 50 and has connected thereto on the opposite side of the bearing cap cam mechanism 31 which controls a locking device for the turret as described in specification of application No. 286,054 which sleeve 29 has also keyed to it one part 32 of a one revolution clutch the other part 38 of which is fixed to the back shaft 30. Axial engaging movement of the clutch part 32 is effected by the spring 42 after the withdrawal of a pin 43 from a groove 44 in the clutch part by means of lever link mechanism 45 (Figure 3) actuated by the aforesaid second cam 46 as described in specification of application No. 288,588. Disengagement of the clutch is automatically effected after one revolution. The cam 46 has an equivalent number of projections 49 on it to the number of inflexions on the cam 5. The sleeve also carries a pinion 33 which engages another pinion 34 on a sleeve 35 encircling the intermediate shaft 36, which second sleeve has connected thereto yet a further cam 37 which controls the withdrawal of the turret slide 39 in a manner described in the specifications of applications Nos. 288,588 and 286,053. The axial movement of the sleeve 29 connected to the dog carrier 24 and cam disc 23 is limited in one direction by the cam disc coming into contact with one end of the bearing cap 50 and at the other limit by the pinion 33 on the sleeve 29 coming into contact with the opposite side of the bearing cap 50. It is normally maintained in this position by the spring 42 and in this position the dog 25 may engage the slots in the Geneva wheel 26. The Geneva wheel 26 is fixed to the intermediate shaft 36 which shaft drives the indexing mechanism of the turret 40 through skew gearing 41 as described in specifications of applications Nos. 286,053; 286,054 and 288,588. With the above arrangement assuming the roller 22 is withdrawn from the cam disc 23 when the dog clutch 32, 38 is engaged under the control of the timing shaft or front shaft the following sequence of movements takes place. The cam 37 is rotated through the gearing 33, 34 and in rotating causes the turret slide 39 to complete its withdrawal from the work. During this withdrawal movement continued rotation of the sleeve 29 carrying with it the cams 31, the cam disc 23 and dog carrier 24 will first withdraw the turret locking mechanism by means of one of the cams 31 then engage the dog 25 with the Geneva wheel which will result in the turret 40 being rotated through the gearing 41 while the turret slide 39 is still withdrawn. Should however the roller 22 be moved opposite the cam disc 23 (by reason of the roller 19 on the lever arm falling into one of the depressions in the cam 15), upon the initial rotation of the cam disc 23 the dog 25 will be moved out of the path of the Geneva wheel and the cams 31 will be moved out of the path of the follower which operates the release mechanism for the turret locking device. Thus the turret remains locked and the indexing mechanism remains inoperative although the turret slide is withdrawn.

I claim:

1. Turret actuating mechanism for the turret of a machine tool, which mechanism comprises means for bodily traversing the turret for machining operations, continuously-rotating cam means controlling said traversing means, means for indexing the turret, a transmission to said indexing means, control means for initiating and interrupting the operation of said transmission, second cam means rotating synchronously with the first-said cam means for actuating said control means, a coupling in said transmission, third cam means rotating synchronously with the first-said cam means for interrupting said coupling, thereby rendering the operation of the second cam means ineffective and permitting a traverse of the turret without indexing.

2. Turret actuating mechanism as claimed in claim 1 in which said transmission is provided with a Geneva wheel, a rotatable dog carrier, a dog on said carrier and engageable with the Geneva wheel, said coupling comprising means for imparting relative axial movement between the Geneva wheel and the dog whereby their paths of rotational movement can be brought clear of one another.

3. Turret actuating mechanism as claimed in claim 1 in which means are provided for adjusting the angular relationship of the third cam means with respect to the first-said cam means, whereby indexing is prevented after any selected machining operation.

4. Turret actuating mechanism as claimed in claim 1 in which the first-said cam means is such as to actuate the traversing means a plurality of times during one rotation thereof, the second cam means being such as to initiate the operation of said transmission the same number of times during a cycle, and the third cam means being adjustable, whereby the coupling is interrupted after any selected machining operation.

5. In an automatic machine tool, turret actuating mechanism comprising a continuously-rotating front shaft, a cross shaft driven thereby, a continuously-driven back shaft, a cam shaft, a one-revolution clutch between the back shaft and the cam shaft, a dog carrier axially movable on the cam shaft, a dog thereon, an intermediate shaft, a Geneva wheel on the intermediate shaft and engageable by the dog, turret indexing gearing, a driving connection between the intermediate shaft and the indexing gearing, turret traversing means, a first cam on said cross-shaft for actuating the traversing means in a cutting direction, a second cam on the front shaft for operating the one-revolution clutch and a third cam on the cross-shaft for causing axial movement of the dog carrier so that the dog rotates clear of the Geneva wheel, whereby operation of the one-revolution clutch will not cause indexing of the turret.

WILLIAM ELIAS REGINALD PULMAN.

References Cited in the file of this patent

UNITED STATES PATENTS

| Number | Name | Date |
|---|---|---|
| 2,460,156 | Vanderhide | Jan. 25, 1949 |